United States Patent [19]
Pardieck

[11] 3,771,926
[45] Nov. 13, 1973

[54] LEAKAGE PREVENTING ARRANGEMENT FOR PRESSURIZED FLUID SYSTEM SUCH AS PUMPS AND THE LIKE

[75] Inventor: William J. Pardieck, Wilmington, Ill.

[73] Assignee: R. S. Corcoran Co., New Lenox, Ill.

[22] Filed: Dec. 6, 1971

[21] Appl. No.: 205,120

[52] U.S. Cl..................... 415/176, 415/112, 417/424
[51] Int. Cl................................................ F01d 5/08
[58] Field of Search............................ 415/176, 112; 417/424

[56] References Cited
UNITED STATES PATENTS

| | | |
|---|---|---|
| 3,211,101 | 10/1965 | Ashworth et al. .................. 415/176 |
| 1,228,770 | 6/1917 | Halstead ............................. 415/112 |
| 1,277,381 | 9/1918 | Chapman............................. 415/112 |
| 1,954,824 | 4/1934 | Mendenhall et al................ 417/424 |
| 2,468,704 | 4/1949 | Pippin................................ 417/424 |
| 2,470,563 | 5/1949 | Jennings ............................ 417/424 |
| 2,930,325 | 3/1960 | Beard et al. ....................... 417/424 |
| 3,130,246 | 4/1964 | Banks ................................. 417/424 |
| 3,160,106 | 12/1964 | Ashworth............................ 415/112 |
| 3,407,739 | 10/1968 | Myers ................................. 417/424 |
| 3,612,715 | 10/1971 | Yedidiah............................. 415/214 |

Primary Examiner—C. J. Husar
Attorney—C. Frederick Leydig et al.

[57] ABSTRACT

In a pump or other fluid system having a rotatable shaft journaled in a supporting member, such as a wall of the pump chamber, having ambient pressure on one side and a liquid system pressure greater than ambient pressure on the other side, a centrifugal member for preventing leakage of fluid through the shaft journal. The centrifugal member reduces the pressure on the system side of the supporting member to a pressure substantially equal to the ambient pressure, so that there is no pressure differential across the shaft journal. This prevents leakage of pressurized liquid out of the system, and also prevents air from leaking into the system and becoming entrained in the pressurized liquid. In an illustrated embodiment, the centrifugal member comprises a dished annulus spaced from a flat annulus, with a plurality of radial vanes interconnecting the two annuli.

4 Claims, 4 Drawing Figures

PATENTED NOV 13 1973  3,771,926

LEAKAGE PREVENTING ARRANGEMENT FOR PRESSURIZED FLUID SYSTEM SUCH AS PUMPS AND THE LIKE

DESCRIPTION OF THE INVENTION

The present invention relates generally to fluid systems such as pumps and the like which handle liquids under various system pressures and which require seals or other means to prevent leakage of the pressurized liquid. More particularly, the invention relates to such fluid systems which have a rotatable shaft journaled in the wall of a fluid chamber containing pressurized liquid.

It is a primary object of the present invention to provide an improved fluid system of the foregoing type which prevents leakage of the pressurized liquid through the wall of the fluid chamber in which the rotatable shaft is journaled while the shaft is rotating.

Another object of the invention is to provide such an improved fluid system which does not require any fluid seal between the rotatable shaft and the wall of the fluid chamber in which the shaft is journaled.

A still further object of the invention is to provide such an improved fluid system which is simple and economical to manufacture and which has a long operating life with low maintenance costs.

A more particular object of one aspect of the invention is to provide a pump which satisfies all of the foregoing objectives.

Other objects and advantages of the invention will become apparent from the following detailed description taken in connection with the accompanying drawings, in which.

Figure 1:
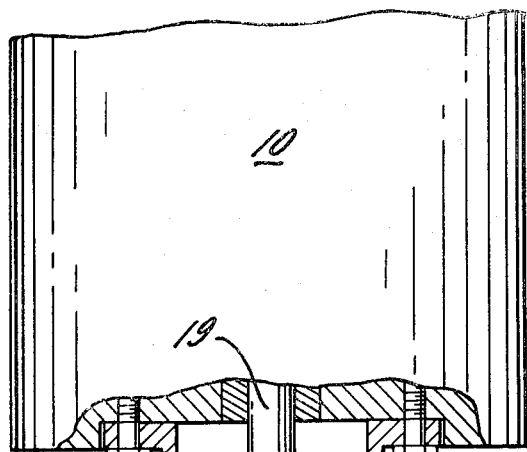
FIG. 1 is a fragmentary elevation, partially in section, of a drum pump embodying the invention.
Figure 2:
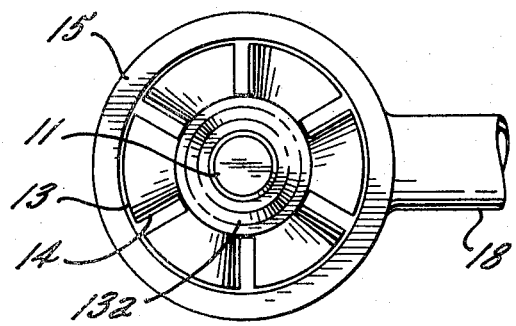
FIG. 2 is an enlarged bottom plan of the pump of FIG. 1.
Figure 3:
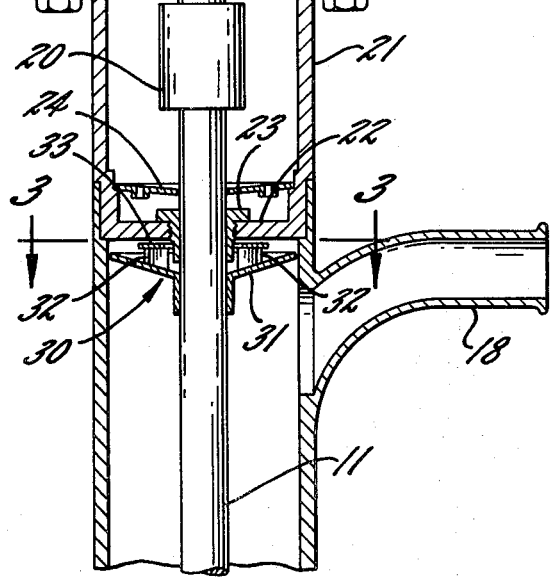
FIG. 3 is an enlarged section taken along line 3—3 in FIG. 1.
Figure 4:
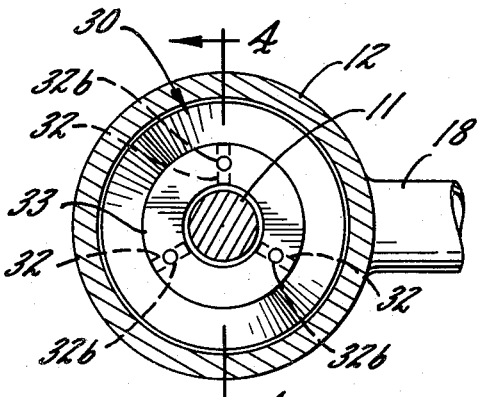
FIG. 4 is an enlarged section taken along line 4—4 in FIG. 3.

While the invention is susceptible of various modifications and alternative forms, certain specific embodiments thereof have been shown by way of example in the drawings which will be described in detail herein. It should be understood, however, that it is not intended to limit the invention to the particular forms disclosed, but, on the contrary, the intention is to cover all modifications, equivalents and alternatives falling within the spirit and scope of the invention.

Turning now to the drawings and referring first to FIG. 1, there is shown an axial flow drum pump having a drive motor contained within a housing 10 for rotating an elongated propeller shaft 11 extending concentrically through an elongated tubular member 12 adapted to extend down into a drum from which liquid is to be removed by pumping. At the lower end of the tubular member 12, the shaft 11 carries a propeller 13 which is threaded onto the lower end of the shaft 11 until the end of the shaft engages a retainer plate 13a welded to the main body portion of the propeller. The propeller 13 draws liquid out of the drum and propels it upwardly through axial passageways 14 in a lower bearing retainer 15. The annular inner portion 16 of the bearing retainer 15 holds a bearing 17 for the lower end of the elongated shaft 11. From the bearing retainer 15, the incoming liquid is forced upwardly through the annular pump chamber between the shaft 11 and the tubular member 12 and flows out of the pump chamber through exit nozzle 18 at the upper end of the member 12. Of course, the nozzle 18 is located above the top of the drum from which the liquid is being pumped and is typically connected to a suitable hose or other conduit means for carrying the liquid away from the pump. It will be understood that pumps of this type may be designed to pump liquids over a relatively wide range of system pressures.

At the upper end of the shaft 11, the shaft 19 of the drive motor is connected to the propeller shaft 11 by means of a conventional shaft coupling 20. The coupling 20 and the coupled ends of the two shafts 11 and 19 are contained within a cylindrical housing 21 bolted to the underside of the motor housing 10, and having an inwardly extending flange 22 on the lower end thereof. The flange 22 forms the upper end of the pump chamber, and is threaded to receive a bearing sleeve 23 around the shaft 11, so that the shaft 11 is journalled in the upper end wall of the pump chamber. The inner wall of the cylinder 21 is stepped just above the bearing 23 for receiving and supporting a cover plate 24.

In accordance with the present invention, a centrifugal member is secured to the pump shaft within the pump chamber for reducing the liquid pressure around the surface of the shaft, adjacent the system pressure side of the end wall, to a pressure substantially equal to the ambient pressure on the outside of the end wall. This pressure reduction is effected in response to rotation of the shaft, thereby preventing fluid transfer through the end wall of the pump chamber where the propeller shaft is journaled therein, while the shaft is rotating. Thus, in the illustrative arrangement, a centrifugal member 30 includes a dished lower annulus 31 press-fitted onto the shaft 11 just below the flange 22 which forms the upper end wall of the pump chamber. More specifically, the annulus 31 is dished so that it is concave on the upper side thereof. The dished annulus 31 supports three equally spaced radial vanes 32 which are held in place on the annulus 31 by means of lugs 32a formed on the lower edges thereof and fitting into correspondence holes formed in the annulus 31. Similar lugs 32b are formed on the top edges of the vanes 32 and fit into holes formed in an upper annulus 33. The diameter of the lower annulus 31 is such that there is only a slight clearance between the outer periphery thereof and the inner wall of the tubular member 12, whereas the upper annulus 33 has a much smaller outside diameter, and a larger inside diameter so as to form a clearance between the inner periphery of the annulus 33 and the shaft 11. Consequently, it can be seen that the liquid within the pump chamber, which is pressurized by the pumping mechanism, is free to flow upwardly past the outer periphery of the dished annulus 31. However, any liquid that enters the region above the dished annulus 31 is subjected to the centrifugal action of the centrifugal member 30, and particularly the radially oriented vanes 32. As a result, the pressure around the shaft 11 at the lower end of the bearing 23 is reduced to a pressure substantially equal to the ambient pressure at the top end of the bearing 23. As a result, there is no pressure differential across the bearing 23 in the axial direction, and thus fluid leakage in the axial direction between the inner surface of the bearing 23 and the outer surface of the shaft 11 is effectively prevented, even though there is no sealing member provided between the bearing 23 and the shaft 11.

It will be appreciated that the centrifugal member 30 is specifically designed to achieve a pressure at the lower end of the bearing 23 which is substantially equal to the pressure at the top end of the bearing 23. If the pressure at the bottom of the bearing 23 is greater than the pressure at the top, the liquid will tend to flow upwardly between the bearing 23 and the shaft 11 into the chamber defined by cylinder 21. On the other hand, if the pressure at the bottom of the bearing 23 is reduced below the pressure at the top, air will leak down along the inner surface of the bearing 23 and become entrained in the liquid being pumped, which is obviously an undesirable result. In order to achieve the desired equalization of pressure at opposite ends of the bearing 23, the centrifugal member 30 may be provided with a wide variety of different dimensions and physical configurations. With the particular configuration illustrated, for example, the lower annulus 31 may be provided with different diameters and may be dished at different angles; the vanes 32 may be employed in different sizes, shapes and numbers; and the inside and outside diameters of the upper annulus 33 may be varied. In other configurations, the upper annulus 33 may be eliminated completely, provided the vanes 32 are welded or otherwise firmly secured to the lower annulus 31. Numerous other possible configurations of the centrifugal member 30 may be determined empirically, to achieve the desired effect of substantially equal pressures at opposite ends of the bearing 23 so as to prevent fluid transfer therethrough. The design of the centrifugal member 30 is also dependent to some extent on the liquid pressure created by the pump within the pump chamber, since the member 30 must overcome this system pressure in order to equalize the pressure at opposite ends of the bearing 23.

As one specific example of the invention, in a drum pump having the configuration illustrated in the drawings and creating a pressure of 9 psig in the pump chamber, the dimensions of the centrifugal member 30 and associated parts are as follows:

Clearance between bearing 23 and shaft 11: 0.010"
Outside diameter of annulus 31: 1.688"
Inside diameter of annulus 31: 0.437"
Outside diameter of annulus 33: 0.938"
Inside diameter of annulus 33: 0.469"
Inside diameter of tubular member 12: $1^{47}/_{64}$"

While the invention has been described with specific reference to a drum pump, it will be appreciated that the invention is applicable to any pressurized fluid system where it is desired to prevent fluid leakage along a rotating shaft journaled in a supporting member having system pressure on one side thereof and ambient pressure on the other side. It will also be appreciated that the centrifugal member that prevents fluid leakage through the shaft journal is effective only while the shaft is rotating, and thus the journal cannot be exposed to fluid pressure when the shaft is not rotating. For example, in the illustrative drum pump, the liquid level in the pump chamber will always be below the centrifugal member 30 when the shaft 11 is not rotating.

As can be seen from the foregoing detailed description, this invention provides an improved arrangement for preventing fluid leakage through the journal of a rotating shaft in a pressurized fluid system without the use of conventional fluid sealing elements between the shaft and its bearing or associated supporting structure. The arrangement provided by this invention is extremely simple and economical to manufacture, has a long operating life with little or no maintenance, and is applicable to a wide variety of different pumps or other equipment used in pressurized fluid systems.

I claim as my invention:

1. In a fluid system having a rotatable shaft journaled in a supporting member having ambient pressure on one side thereof and a liquid system pressure greater than said ambient pressure on the other side thereof, and a centrifugal member secured to said shaft on the system pressure side of said supporting member for reducing the liquid pressure around the surface of said shaft adjacent the system pressure side of said supporting member to a pressure substantially equal to said ambient pressure in response to rotation of said shaft, thereby preventing fluid transfer through said supporting member where said shaft is journaled therein, said centrifugal member comprising a first annulus having a free outer periphery to permit the flow of liquid past said outer periphery, the inner periphery of said first annulus being connected to said shaft to prevent the flow of liquid between said inner periphery and said shaft, a second annulus spaced axially away from said first annulus and having free inner and outer peripheries to permit the flow of liquid past both of said peripheries, and a plurality of radial vanes disposed between said first and second annuli for supporting said second annulus on said first annulus and for centrifuging liquid radially outwardly therefrom so as to reduce the liquid pressure around the inner periphery of said second annulus.

2. A fluid system as set forth in claim 1 in which said first annulus is concave on the side facing said second annulus.

3. A pump comprising the combination of means forming a pump chamber having a liquid inlet and outlet, a rotatable shaft extending through the wall of said pump chamber and carrying a pumping member for pumping liquid from said inlet to said outlet, said shaft being journaled in the wall of said pump chamber, drive means connected to said shaft outside said pump chamber for rotating said shaft and said pumping member, and a centrifugal member secured to said shaft within said pump chamber adjacent the chamber wall in which said shaft is journaled for reducing the liquid pressure around the surface of said shaft adjacent said chamber wall to substantially the ambient pressure on the outside of said pump chamber in response to rotation of said shaft, thereby preventing fluid transfer through said chamber wall where said shaft is journaled therein, said centrifugal member comprising a first annulus having a free outer periphery to permit the flow of liquid past said outer periphery, the inner periphery of said first annulus being connected to said shaft to prevent the flow of liquid between said inner periphery and said shaft, a second annulus spaced axially away from said first annulus and having free inner and outer peripheries to permit the flow of liquid past both of said peripheries, and a plurality of radial vanes disposed between said first and second annuli for supporting said second annulus on said first annulus and for centrifuging liquid radially outwardly therefrom so as to reduce the liquid pressure around the inner periphery of said second annulus.

4. A pump as set forth in claim 3 in which said first annulus is concave on the side facing said second annulus.

* * * * *